United States Patent
Fiatal et al.

(10) Patent No.: US 7,680,281 B2
(45) Date of Patent: *Mar. 16, 2010

(54) METHOD AND APPARATUS FOR INTERCEPTING EVENTS IN A COMMUNICATION SYSTEM

(75) Inventors: Trevor Fiatal, Fremont, CA (US); Jay Sutaria, Mountain View, CA (US); Sridhar Nanjundeswaran, Mountain View, CA (US); Shailesh Bavadekar, Fremont, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/211,790

(22) Filed: Sep. 16, 2008

(65) Prior Publication Data

US 2009/0016526 A1    Jan. 15, 2009

Related U.S. Application Data

(63) Continuation of application No. 11/255,291, filed on Oct. 20, 2005, now Pat. No. 7,441,271.

(60) Provisional application No. 60/620,889, filed on Oct. 20, 2004.

(51) Int. Cl.
*H04K 1/00* (2006.01)
*G06F 11/00* (2006.01)

(52) U.S. Cl. .......................... 380/255; 726/22
(58) Field of Classification Search ................ 726/22; 380/250, 255; 713/150
See application file for complete search history.

(56) References Cited

U.S. PATENT DOCUMENTS

| | | | |
|---|---|---|---|
| 4,255,796 A | 3/1981 | Gabbe et al. | |
| 4,276,597 A | 6/1981 | Dissly et al. | |
| 4,531,020 A | 7/1985 | Wechselberger et al. | |
| 4,831,582 A | 5/1989 | Miller et al. | |
| 4,875,159 A | 10/1989 | Cary et al. | |
| 4,897,781 A | 1/1990 | Chang et al. | |
| 5,263,157 A | 11/1993 | Janis | |

(Continued)

FOREIGN PATENT DOCUMENTS

JP    4-154233    5/1992

(Continued)

OTHER PUBLICATIONS

Lotus Development Corporation, Lotus Notes Release 3.1: The Groupware Standard, Site and Systems Planning Guide 1991.

(Continued)

*Primary Examiner*—Emmanuel L Moise
*Assistant Examiner*—Ali S Abyaneh
(74) *Attorney, Agent, or Firm*—Stolowitz Ford Cowger LLP (57) ABSTRACT

An intercept system provides more effective and more efficient compliance with legal intercept warrants. The intercept system can provide any combination of operations that include near-real-time intercept, capture of intercepted data in structured authenticated form, clear text intercept for communications where there is access to encryption keys, cipher text intercept for communications where there is no access to encryption keys, provision of transactional logs to the authorized agency, interception without altering the operation of the target services, and encryption of stored intercepted information.

25 Claims, 6 Drawing Sheets

U.S. PATENT DOCUMENTS

| | | | |
|---|---|---|---|
| 5,357,431 A | 10/1994 | Nakada et al. |
| 5,386,564 A | 1/1995 | Shearer et al. |
| 5,392,390 A | 2/1995 | Crozier |
| 5,572,571 A | 11/1996 | Shirai |
| 5,572,643 A | 11/1996 | Judson |
| 5,581,749 A | 12/1996 | Hossain et al. |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Neilsen et al. |
| 5,787,441 A | 7/1998 | Beckhardt |
| 5,790,425 A | 8/1998 | Wagle |
| 5,790,790 A | 8/1998 | Smith et al. |
| 5,799,318 A | 8/1998 | Cardinal et al. |
| 5,818,437 A | 10/1998 | Grover et al. |
| 5,832,483 A | 11/1998 | Barker |
| 5,857,201 A | 1/1999 | Wright, Jr. et al. |
| 5,870,759 A | 2/1999 | Bauer et al. |
| 5,907,618 A | 5/1999 | Gennaro et al. |
| 5,909,689 A | 6/1999 | Van Ryzin |
| 5,943,676 A | 8/1999 | Boothby |
| 5,961,590 A | 10/1999 | Mendez et al. |
| 5,968,131 A | 10/1999 | Mendez et al. |
| 5,974,327 A | 10/1999 | Agrawal et al. |
| 6,006,274 A | 12/1999 | Hawkins et al. |
| 6,023,708 A | 2/2000 | Mendez et al. |
| 6,044,381 A | 3/2000 | Mendez et al. |
| 6,047,051 A | 4/2000 | Ginzboorog et al. |
| 6,085,192 A | 7/2000 | Mendez et al. |
| 6,119,014 A | 9/2000 | Alperovich et al. |
| 6,131,096 A | 10/2000 | Ng et al. |
| 6,131,116 A | 10/2000 | Riggins et al. |
| 6,138,013 A * | 10/2000 | Blanchard et al. ............ 455/428 |
| 6,138,124 A | 10/2000 | Beckhardt |
| 6,141,664 A | 10/2000 | Boothby |
| 6,151,606 A | 11/2000 | Mendez |
| 6,173,446 B1 | 1/2001 | Khan et al. |
| 6,198,922 B1 | 3/2001 | Baynham |
| 6,201,469 B1 | 3/2001 | Balch et al. |
| 6,212,529 B1 | 4/2001 | Boothby et al. |
| 6,221,877 B1 | 4/2001 | Aronov et al. |
| 6,223,187 B1 | 4/2001 | Boothby et al. |
| 6,233,341 B1 | 5/2001 | Riggins |
| 6,246,875 B1 | 6/2001 | Seazholtz et al. |
| 6,317,594 B1 | 11/2001 | Grossman et al. |
| 6,320,943 B1 | 11/2001 | Borland |
| 6,324,542 B1 | 11/2001 | Wright, Jr. et al. |
| 6,415,031 B1 | 7/2002 | Colligan et al. |
| 6,421,781 B1 | 7/2002 | Fox et al. |
| 6,438,612 B1 | 8/2002 | Ylonen et al. |
| 6,490,353 B1 | 12/2002 | Tan |
| 6,526,506 B1 | 2/2003 | Lewis |
| 6,668,046 B1 | 12/2003 | Albal |
| 6,707,801 B2 | 3/2004 | Hsu |
| 6,708,221 B1 | 3/2004 | Mendez et al. |
| 6,745,024 B1 | 6/2004 | DeJaco et al. |
| 6,799,190 B1 | 9/2004 | Boothby |
| 6,892,070 B2 | 5/2005 | Warrier et al. |
| 6,947,770 B2 | 9/2005 | Rydbeck |
| 6,986,061 B1 | 1/2006 | Kunzinger |
| 7,032,242 B1 | 4/2006 | Grabelsky et al. |
| 7,219,222 B1 | 5/2007 | Durbin et al. |
| 7,310,729 B2 | 12/2007 | Gordon et al. |
| 7,382,879 B1 | 6/2008 | Miller |
| 2001/0032254 A1 | 10/2001 | Hawkins et al. |
| 2001/0034244 A1 | 10/2001 | Calder et al. |
| 2001/0037453 A1 * | 11/2001 | Mitty et al. .................. 713/168 |
| 2002/0038253 A1 | 3/2002 | Seaman et al. |
| 2002/0059457 A1 | 5/2002 | Ballard et al. |
| 2002/0068559 A1 | 6/2002 | Sharma et al. |
| 2002/0077077 A1 | 6/2002 | Rezvani et al. |
| 2002/0078384 A1 | 6/2002 | Hippelainen |
| 2002/0091921 A1 | 7/2002 | Kunzinger |
| 2002/0144109 A1 | 10/2002 | Benantar et al. |
| 2002/0146129 A1 | 10/2002 | Kaplan |
| 2002/5016192 | 10/2002 | Munger et al. |
| 2002/0186848 A1 | 12/2002 | Shaik |
| 2002/0194209 A1 | 12/2002 | Bolosky et al. |
| 2002/0198027 A1 | 12/2002 | Rydbeck |
| 2003/0093691 A1 | 5/2003 | Simon et al. |
| 2003/0100326 A1 | 5/2003 | Grube et al. |
| 2003/0126216 A1 | 7/2003 | Avila et al. |
| 2003/0130984 A1 | 7/2003 | Quinlan et al. |
| 2003/0157947 A1 | 8/2003 | Fiatal et al. |
| 2003/0177281 A1 | 9/2003 | McQuillan et al. |
| 2004/0170257 A1 | 9/2004 | Gross et al. |
| 2004/0179513 A1 | 9/2004 | Smith et al. |
| 2004/0255126 A1 * | 12/2004 | Reith .......................... 713/183 |
| 2005/0063544 A1 * | 3/2005 | Uusitalo et al. ............. 380/277 |
| 2005/0138111 A1 | 6/2005 | Aton et al. |
| 2005/0183143 A1 * | 8/2005 | Anderholm et al. ........... 726/22 |

FOREIGN PATENT DOCUMENTS

| | | |
|---|---|---|
| JP | 2001-218185 | 10/2001 |
| WO | WO 97/41661 | 11/1997 |
| WO | 9824257 | 6/1998 |
| WO | WO 98/58322 | 12/1998 |
| WO | 03098890 | 11/2003 |
| WO | 2004045171 | 5/2004 |

OTHER PUBLICATIONS

Lotus Development Corporation, Lotus Notes: The Groupware Standard- Windows, 1994.

International Search Report for PCT/US03/00618, Date of completion Mar. 19, 2003; Date of Mailing Apr. 4, 2003; ISA/US.

International Search Report for PCT/US03/00624, Date of completion, Apr. 8, 2003; Date of Mailing May 13, 2003; ISA/US.

International Search Report for PCT/US05/038135, Date of completion, Jan. 30, 2007; Mailing Date Aug. 8, 2008; ISA/US.

International Search Report for PCT/US05/37702, Date of completion Oct. 24, 2007; Date of Mailing Nov. 5, 2007; ISA/US.

International Preliminary Examination Report for PCT/US05/37702, Date of completion Nov. 20, 2007; ISA/US.

Written Opinion of the International Searching Authority for PCT/US05/37702; Date of completion Oct. 24, 2007; Date of mailing Nov. 5, 2007; ISA/US.

Written Opinion of the International Searching Authority for PCT/US05/38135; Date of completion Jul. 14, 2008; Date of mailing Aug. 8, 2008; ISA/US.
Stolowitz Ford Cowger, LLP, Listing of Related Cases, Jul. 13, 2009.
Victor S. Miller, "Use of Elliptic Curves in Cryptography", Lecture Notes in Computer Science, May 21, 1986, vol. 218, p. 417-426, Advances in Cryptology-Crypto' 85.
Netscape Communications Corporation, Administrator's Guide, Netscape Mail Server, Version 2.0, 1995.
IBM, "The Architecture of Lotus Notes", White Paper, No. 114654, modified date: May 31, 1995.
Lotus Development Corporation, Lotus Notes Knowledge Base, "What is the Notes Replicator", Jul. 5, 1995.
Grous, Paul J., "Creating and Managing a Web Site with Lotus' InterNotes Web Publisher", The View Technical Journal for Lotus Notes® Software, vol. 1, Issue 4, Sep./Oct. 1995, pp. 3-18.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall" Protection for a Notes Domain", Nov. 6, 1995.
Lotus Development Corporation, Lotus Notes Release 4 Install Guide for Workstations, First Revision, 1996.
Lotus Development Corporation, Lotus Step by Step: A Beginner's Guide to Lotus Notes, First Revision, 1996.
Freeland, Pat and Londergan, Stephen, Lotus Notes Release 4 for Dummies™, IDG Books Worldwide, 1996.
Kreisle, Bill, Teach yourself . . . Lotus Notes 4, MIS:Press, 1996.
Marmel, Elain, Easy Lotus® Notes Release 4.0, Que Corporation, 1996.
Lotus Development Corporation, Lotus Notes Server Up and Running!, Release 4, 1996.
Falkner, Mike, "How to Plan, Develop, and Implement Lotus Notes in Your Organization", Wiley Computer Publishing, John Wiley and Sons, Inc., 1996.
Lamb, John P., et al., "Lotus Notes Network Design", McGraw-Hill, 1996.
Tamura, Randall A., et al., Lotus Notes 4 Unleashed, Sams Publishing, 1996.
Lotus Development Corporation, Lotus Notes Internet Cookbook for Notes Release 3, Jan. 16, 1996.
Wong, Harry, "Casahl's Replic-Action: Delivering True Notes/DBMS Integration", The View Technical Journal for Lotus Notes® Software, vol. 2, Issue 1, Jan./Feb. 1996, pp. 33-50.
IBM International Technical Support Organization, Lotus Notes Release 4 In a Multiplatform Environment, Feb. 1996.
Lotus Development Corporation, Lotus Notes Internet Cookbook for Notes Release 4, Feb. 14, 1996.
Frenkel, Garry, "Pumping for Info: Notes and Database Integration", Network Computing, May 1, 1996, pp. 76-84.
Lotus Development Corporation, Lotus Notes Knowledge Base, "Firewall Security Overview and How Firewalls Relate to Lotus Notes", May 22, 1996.
IBM Corporation, Secrets to Running Lotus Notes: The Decisions No One Tells You How to Make, Oct. 1996.
Swedeen, Bret, et al., "Under the Microscope: Domino Replication", LDD Today, Oct. 1, 1998.
Lotus Development Corporation, Lotus Inside Notes: The Architecture of Notes and the Domino Server, 2000.
Lotus Software Agreement for "Notes 4.0 NA DKTP Client UPG", Part No. 38985, Date unknown.
Lotus Development Corporation, Lotus Notes Release 3.1: Administrator's Guide—Server for Windows, 1993.
Pyle, Hugh, "The Architecture of Lotus Notes", Lotus Notes Advisor, Advisor Publication, Premier Issue 1995, pp. 18-27.
Lotus Notes Advisor, Advisor Publications, Jun. 1995, entire magazine.
Lotus Notes Advisor, Advisor Publications, Aug. 1995, entire magazine.
Lotus Notes Advisor, Advisor Publications, Oct. 1995, entire magazine.
Balaban, Bob, "This is Not Your Father's Basic: LotusScript in Notes Release 4", Lotus Notes Advisor, Advisor Publications, vol. 1, No. 5, Nov./Dec. 1995, pp. 31-58.
Pyle, Lisa, "A Jump Start to the Top Ten R3-to-R4 Migration Considerations", Lotus Notes Advisor, Advisor Publications, vol. 1, No. 5, Nov./Dec. 1995, pp. 3-20.
Lotus Notes Advisor, Advisor Publications, Dec. 1995, entire magazine.
Dahl, Andrew, Lotus Notes 4 Administrator's Survival Guide, Sams Publishing, 1996.
Netscape Communications Corporation, Administrator's Guide, Netscape News Server, Version 2.0, 1996.
Lotus Notes Advisor, Advisor Publications, Jan./Feb. 1996, entire magazine.
Blaney, Jeff, "You Can Take it with you: An Introduction to Mobile Computing with Notes R4", The View Technical Journal for Lotus Notes® Software, vol. 2, Issue 1, Jan./Feb. 1996, pp. 22-32.
Lotus Notes Advisor, Advisor Publications, Apr. 1996, entire magazine.
Lotus Notes Advisor, Advisor Publications, Jun. 1996, entire magazine.
Augun, Audry, "Integrating Lotus Notes with Enterprise Data", Lotus Notes Advisor, Advisor Publications, Jul./Aug. 1996, pp. 22-25.
Lotus Notes Advisor, Advisor Publications, Aug. 1996, entire magazine.
Lotus Notes Advisor, Advisor Publications, Oct. 1996, entire magazine.
Opyt, Barbara, et al., "Use the Internet as Your Lotus Notes WAN", Lotus Notes Advisor, Advisor Publications, Nov./Dec. 1996, pp. 17-20.
Lotus Notes Advisor, Advisor Publications, Dec. 1996, entire magazine.
"The History of Notes and Domino", Lotus Developer Domain, Lotus, Sep. 29, 2003.
Lotus NotesPump miscellaneous paper, date unknown.
NotesPump 1.0 Release Notes, date unknown.
Lotus Notes-Notes Administration Help screen shot, date unknown.
Chapter 13-1, publication unknown, "Anatomy of a Note ID", date unknown.
Chapter: About NotesPump, publication unknown, date unknown.
Lotus Development Corporation, Lotus Quick Reference for SmartIcons, Lotus Notes Release 3.1, Date unknown.
Lotus Development Corporation, Lotus Quick Reference for Windows and Presentation Manager, Lotus Notes Release 3, Date unknown.
Lotus Development Corporation, Lotus Quick Reference for Macintosh, Lotus Notes Release 3.0, Date unknown.
Lotus Development Corporation, Lotus Quick Reference for Application Developer's, Lotus Notes Release 3, Date Unknown.
Lotus Development Corporation, Lotus Customer Support Service, Lotus Notes Customer Support Guides, Date Unknown.
Lotus Development Corporation, Lotus Notes 3.3, Lotus Customer Support, North American Guide, 29 pages, Date unknown.
Lotus Development Corporation, Lotus Notes 4.0, Lotus Customer Support, North American Guide, 29 pages, Date unknown.
Lotus Development Corporation, Lotus Notes 4.1 Starter Pack; Lotus Customer Support, North American Guide, 51 pages, Date unknown.
Lotus Development Corporation, "LotusScript Classes for Notes Release 4", 6 pages, date unknown.
Allchin, James E., "An Architecture for Reliable Decentralized Systems", UMI Dissertation Services, Copyright 1983.
Lotus Development Corporation, Lotus Notes Release 3.1: The Groupware Standard, Administrator's Guide—Server for NetWare, OS/2, and UNIX, 1989.
Lotus Development Corporation, Lotus Notes 3.0: The Quick and Easy Way to Learn, Ziff-Davis Press, 1993.

Lotus Development Corporation, Lotus Notes Release 3.3: Start Here, Workstation Install for Windows, OS/2 and Macintosh, 1993.
Lotus Development Corporation, Lotus Notes Release 3.1: The Groupware Standard, Customer Services Application Guide, 1994.
Lotus Development Corporation, Lotus Notes Release 3.1: The Groupware Standard, Getting Started with Application Development, 1994.
Lotus Development Corporation, Lotus Notes Release 3.1: The Groupware Standard, Network Driver Documentation, 1994.
Kornblith, Polly R., Lotus Notes Answers: Certified Tech Support, Covers Lotus Notes Release 3, Osborne McGraw-Hill, 1994.
Freeland, Pat and Londergan, Stephen, Lotus Notes 3/3.1 for Dummies™, IDG Books Worldwide, 1994.
Gewirtz, David, Lotus Notes 3 Revealed! Your Guide to Managing Information and Improving Communication Throughout Your Organization, Prima Publishing, 1994.
Shafran, Andrew B., Easy Lotus Notes for Windows™, Que® Corporation, 1994.
Lotus Development Corporation, Lotus Notes Release 3.3: The Groupware Standard, Administration, 1994.
McMullen, Melanie, Editor, Network Remote Access and Mobile Computing, Miller Freeman Inc., 1994.
Lotus Development Corporation, Lotus Notes: The Groupware Standard—Windows, Version 3.3, 1994.
IntelliLink Corporation, IntelliLink® For Windows User's Guide, Version 3.0, 1994.
Lotus Development Corporation, Lotus Notes Release 4: InterNotes Web Navigator Administrator's Guide, 1995.
Lotus Development Corporation, Lotus InterNotes Release 4 Web Publisher: InterNotes Web Publisher Guide, 1995.
Lotus Development Corporation, Lotus Notes Release 4 Install Guide for Servers, 1995.
Lotus Development Corporation, Lotus Notes Release 4.1 Release Notes, 1995.
Lotus Development Corporation, Lotus Notes Release 4 Migration Guide, 1995.
Lotus Development Corporation, Lotus Notes Release 4 Database Manager's Guide, 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1, 1995.
Lotus Development Corporation, Lotus Notes Release 4 Programmer's Guide Part 2, 1995.
Lotus Development Corporation, Lotus Notes Release 4 Administrator's guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering Lotus® Notes®, SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, User's Guide, Netscape Mail Server, Version 2.0 for Unix, 1995.

* cited by examiner

FIG.1

LEGAL INTERCEPT LOG FILE DIRECTORY

51A /INTERCEPT/TREVOR SMITH/2005.09.23

WARRANT ID-ENCRYPTION KEY ~51C

00:00 PDT   fe0-20050923-00:00.ASC  ~56A
            0 EVENTS LOGGED IN LAST MINUTE

00:01 PDT   fe0-20050923-00:01.ASC  ~56B
            0 EVENTS LOGGED IN LAST MINUTE

00:02 PDT   fe0-20050923-00:02.ASC  ~56C
            3 EVENTS LOGGED IN LAST MINUTE

...

23:59 PDT   fe0-20050923-23:59.ASC  ~56D

FIG.6 ions Act of 1997 may have to be met by any proposed
METHOD AND APPARATUS FOR INTERCEPTING EVENTS IN A COMMUNICATION SYSTEM

CROSS REFERENCE TO RELATED APPLICATIONS

The present application is a continuation of U.S. patent application Ser. No. 11/255,291, filed on Oct. 20, 2005, which claims priority to U.S. Provisional Patent Application No. 60/620,889, filed on Oct. 20, 2004, each of which are hereby incorporated by reference in their entirety.

BACKGROUND

Wireless digital communication systems wirelessly transport electronic mail (email), text messages, text files, images, Voice Over Internet Protocol (VoIP) data, and any other types of digital data and communications to wireless devices. Wireless communication system providers are facing the prospects of having to comply with a variety of legal-intercept (wiretap) requirements. Authorization for a legal intercept may include warrants for "wiretap/interception", "search and seizure", or both. For example, the requirements outlined in CALEA (US Communications Assistance for Law Enforcement Act of 1994, http://www.askcalea.net/) may have to be met by any proposed solution. In another example, the requirements outlined by the Australian Communications Authority (http://www.aca.gov.au) in the Australia Telecommunications Act of 1997 may have to be met by any proposed solution.

There are several technical challenges complying with these legal intercept requirements that may not exist in conventional telephone systems. For example, the intercepted data may be encrypted. The wireless network provider must be able to intercept the encrypted data, and any other non-encrypted information, without tipping off the intercept target that the wiretap is taking place.

The wiretap warrant may require the communication system provider to provide any intercepted information in substantially real-time or may require the communication system provider to intercept and store communications in an automated manner for later retrieval and analysis by the law enforcement agency. Evidentiary problems exist with information intercepted outside the presence and control of the enforcement agency. For example, the intercepted communications could be either intentionally or inadvertently deleted. A system malfunction could also prevent some communications from being intercepted. There is also the evidentiary issue of whether or not someone has tampered with the intercepted information. It may also be necessary to prevent technicians operating the communication system from accessing or viewing the intercepted information.

The invention addresses these and other problems with the present technology.

SUMMARY OF THE INVENTION

An intercept system provides more effective and more efficient compliance with legal intercept warrants. The intercept system can provide any combination of operations that include near-real-time intercept, capture of intercepted data in structured authenticated form, clear text intercept for communications where there is access to encryption keys, cipher text intercept for communications where there is no access to encryption keys, provision of transactional logs to the authorized agency, interception without altering the operation of the target services, and encryption of stored intercepted information.

The foregoing and other objects, features and advantages of the invention will become more readily apparent from the following detailed description of a preferred embodiment of the invention which proceeds with reference to the accompanying drawings.

DETAILED DESCRIPTION

In the description below, an intercept event refers to an event where an agency issues a warrant requesting data interception for a targeted user. A targeted user is identified by a unique label, such as a username or account number, that corresponds to a user who is under intercept. A communication event, transaction, or intercept data is any message either sent or received by the targeted user. The intercept data can include synchronization messages, email data, calendars, contacts, tasks, notes, electronic documents, files or any other type of data passing through the communication management system.

Communication Management System

Figure 1:
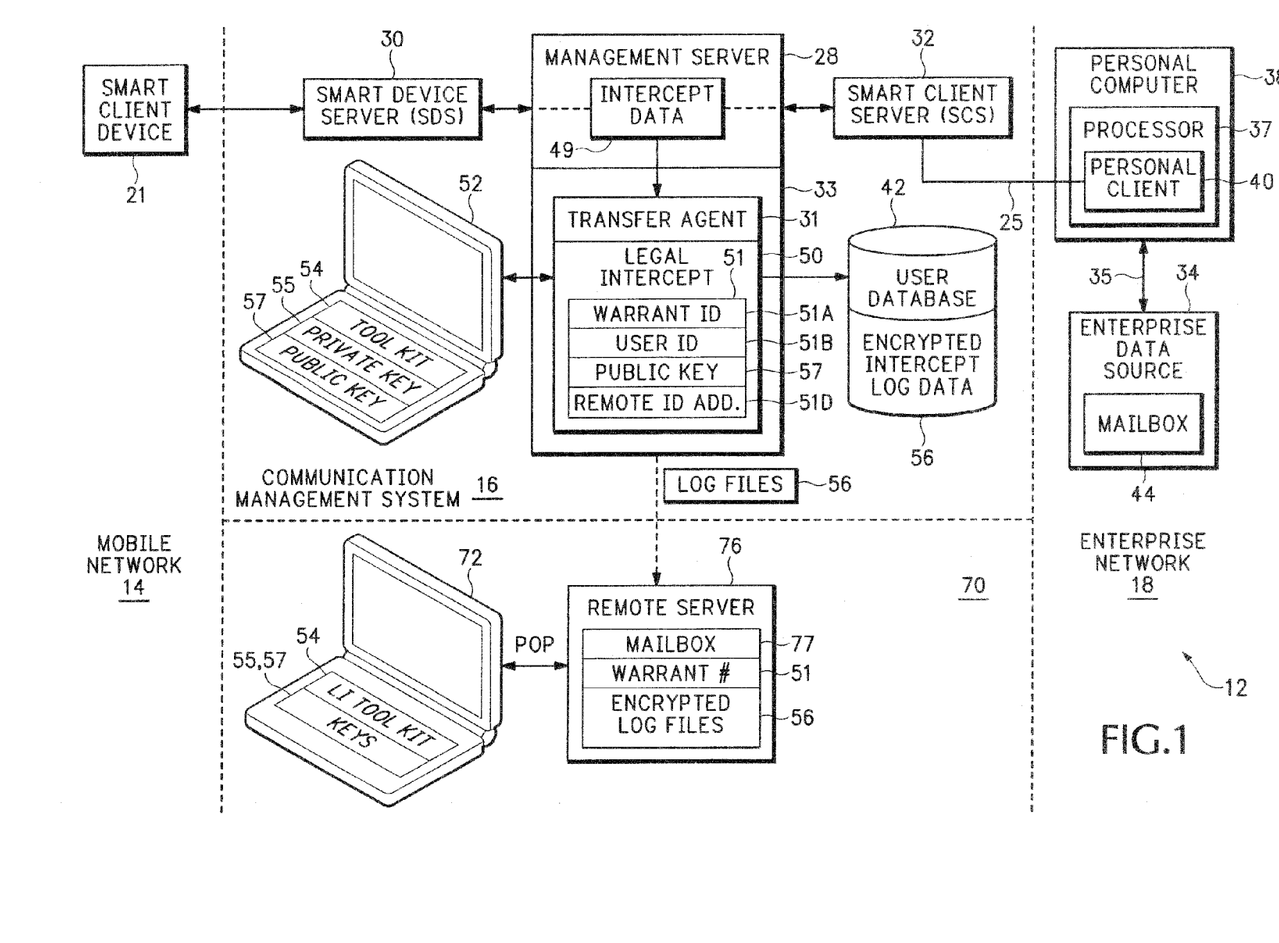
FIG. 1 is a block diagram of a communication management system that operates a legal intercept system.

FIG. 1 shows an example of a communication network 12 that may operate similarly to the networks described in U.S. patent application Ser. No. 10/339,368 entitled: CONNECTION ARCHITECTURE FOR A MOBILE NETWORK, filed Jan. 8, 2003, and U.S. patent application Ser. No. 10/339,368 entitled: SECURE, TRANSPORT FOR MOBILE COMMUNICATION NETWORK, filed Jan. 8, 2003, which are both herein incorporated by reference.

The communication system 12 in one implementation is used for intercepting data pursuant to legal search warrants. For example, a law enforcement agency may require the operator of communication system 12 to intercept all messages sent to and from a mobile device 21. It should be understood that this is just one example of a communication system 12 and that the legal intercept system described in more detail below can operate with any communication network that is required to provide legal interception.

The communication system 12 includes a mobile network 14, an enterprise network 18, and a communication management system 16 that manages communications between the mobile network 14 and the enterprise network 18. The mobile network 14 includes mobile devices 21 that communicate with an IP infrastructure through a wireless or landline service provider. Since mobile networks 14 are well known, they are not described in further detail.

The enterprise network 18 can be any business network, individual user network, or local computer system that maintains local email or other data for one or more users. In the embodiment shown in FIG. 1, the enterprise network 18 includes an enterprise data source 34 that contains a user mailbox 44 accessible using a Personal Computer (PC) 38. In one example, the enterprise data source 34 may be a Microsoft® Exchange® server and the PC 38 may access the mailbox 44 through a Microsoft® Outlook® software application. The mailbox 44 and data source 34 may contain emails, contact lists, calendars, tasks, notes, files, or any other type of data or electronic document.

The PC 38 is connected to the server 34 over a Local Area Network (LAN) 35. The PC 38 includes memory (not shown) for storing local files that may include personal email data as well as any other types of electronic documents. Personal client software 40 is executed by a processor 37 in the PC 38. The personal client 40 enables the mobile device 21 to access email, calendars, and contact information as well as local files in enterprise network 18 associated with PC 38.

The communication management system 16 includes one or more management servers 28 that each include a processor 33. The processor 33 operates a transfer agent 31 that manages the transactions between the mobile device 21 and the enterprise network 18. A user database 42 includes configuration information for different users of the mobile communication service. For example, the user database 42 may include login data for mobile device 21.

While referred to as a communication management system 16 and management server 28, this can be any intermediary system that includes one or more intermediary servers that operate between the mobile network 14 and the enterprise or private network 18. For example, a separate Smart Device Server (SDS) 30 may be used in management system 16 for handling communications with mobile devices in mobile network 14. Correspondingly, a SEVEN Connection Server (SCS) 32 may be used for handling communications with personal clients in enterprise networks 18.

Legal Interception

A Legal Intercept (LI) software module 50 is operated by the processor 33 and communicates with the transfer agent 31 in order to capture intercept data 49 associated with targeted user 51B. An operator sets up a configuration file 51 that is then used by the legal intercept module to automatically intercept communications for a particular target user and then format the intercepted communications into self authenticating log files.

An operator runs a toolkit utility 54 from a computer terminal 52 to configure the management server 28 for capturing intercept data 49. The toolkit utility 54 is used for creating and loading the configuration file 51 into memory in management server 28 and can also display detected intercept data 49. To initiate an intercept, an entry is loaded into the configuration file 51. To stop capturing intercept data 49, the system administrator deletes the entry or configuration file 51 from memory. Changes to the configuration file 51 of management server 28 may be automatically replicated to other management servers that are part of the communication management system 16. The toolkit utility 54 may have tightly controlled access that only allows operation by a user with an authorized login and password.

The toolkit 54 allows the operator to view, add, modify, and delete a warrant sequence number 51A, user identifier (ID) 51B, and encryption key 57 in the configuration file 51. The warrant identifier may be the actual sequence number for a wiretap or search warrant issued by a court of law and presented to the operator of communication management system 16 by a federal, state, or municipal government agency. The user ID 51B for example may be an identifier used by communication management system 16 to uniquely identify different mobile clients 21.

The public encryption key 57 may be the public key component of a public/private key pair, such as a Pretty Good Privacy (PGP) or GNU Privacy Guard (GPG) public key, for encrypting the intercept data 49. In one embodiment, the legal intercept module 50 may not allow the management server 28 to start an interception process until a valid public key 57 is loaded into configuration file 51. This ensures that the intercepted data 49 can be immediately encrypted while being formatted into a log file 56. If this encryption fails for any reason, the legal intercept module 50 may shut down the intercept process ensuring that no intercept data 49 is stored in the clear.

The configuration file 51 may also include one or more entries defining a transport protocol, destination, and associated configuration values for the transmission of intercepted data via a network. In one embodiment, this could include a destination email address associated with a Simple Mail Transfer Protocol (SMTP) host and port number or other Internet Protocol (IP) destination address that is used by the legal intercept module 50 to automatically transmit the intercept data 49 to mail box 77 on a remote server 76 that is accessible by the agency issuing the warrant.

After the configuration file 51 is enabled, the legal intercept module 51 starts intercepting data 49 associated with the targeted user identified by user ID 51B. As mentioned above, this can include any emails, calendar information, contacts, tasks, notes, electronic documents, files or any other type of control or content data associated with user ID 51B. The intercepted data can include any type of communications such as email sent or received, calendar items sent or received, and other data sent/received by and from the targeted smart device 21. The captured intercept data 49 may then be encrypted using the encryption key 57 contained in the configuration file 51. The encrypted copy of the captured intercept data 49 may then be formatted and written to log file 56.

Data Delivery

Figure 4:
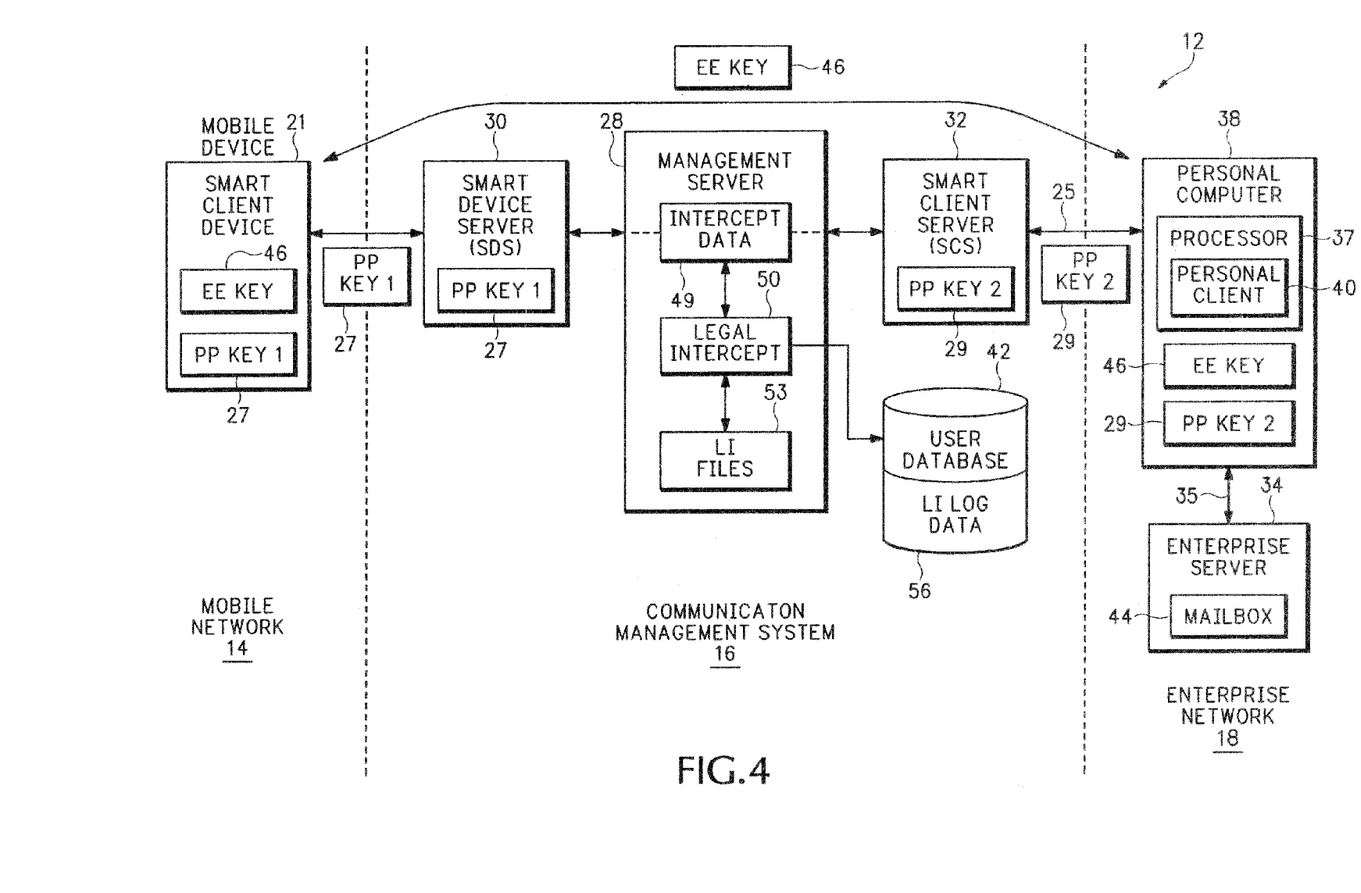
FIG. 4 is another block diagram showing how the legal intercept system operates with different types of encryption.

The legal intercept module 50 running on each management server 28 may periodically poll the directory or location containing the encrypted intercept log files 56 for each user ID under intercept for the presence of new files or data. The poll period in one example is approximately every minute. Of course this is only one example and any user configurable time period can be used. New intercept data 49 which has been stored in one or more log files 56 and identified by the legal intercept module 50 during the polling process may be automatically reprocessed and/or transmitted according to the specification in configuration file 51. As an alternative to storing encrypted intercept data 49 in log file 56 on a file system, intercept data may be stored in database 42. Also, as shown in FIG. 4, the log file 56 may be stored in an alternative file system 53 located within the management server 28. The agency issuing the warrant can then access the data contained in log files 56 or database 42 in one of many different ways.

In one implementation, an official from the agency physically sits at terminal 52 at the location of communication management system 16. The agency official then reads the log files 56 in semi-real-time as the intercept events 49 are being detected in the management server 49. The agency official then uses terminal 52 to store or copy the log files 56 onto a portable storage medium, such as a Compact Disc (CD), memory stick, etc. In this implementation, the legal intercept log files 56 may not reside in user database 42 at all, or may only reside in database 42 for some relatively brief period of time while being transferred onto the portable storage media.

A copy of the log files may be stored onto the portable storage medium while the same log files remain in the communication management system 16. The copy of the log files in the management system 16 could then be used, if necessary, for evidentiary purposes when admitting the copy under control of the agency official into evidence.

In an alternative implementation, the legal intercept module 50 may automatically send the log files 56 for the intercepted events to an email mailbox 77 operated in a remote server 76. The remote server 76 may be located in a wireless service provider network or may be located at the facilities of the enforcement agency issuing the warrant. In this implementation, a terminal 72 at the remote location 70 may include a toolkit utility 54 that has some of the same functionality as toolkit 54. The utility 54 only allows authorized users to decrypt and access the log files 56 received from communication management system 16.

For example, the toolkit utility 54 may include public and private PGP or GPG encryption keys 57 and 55, respectively, that are associated with the public encryption key 57 previously loaded into configuration file 51. Only personnel having authorized access to the toolkit 54 can decrypt and read the log files 56 previously generated and encrypted by legal intercept module 50. This provides additional privacy of the intercept data 49 from technical personnel of the communication management system 16 that may not be authorized to view the intercept data 49.

The intercept module 50 may transfer each captured log file 56 to a SMTP email server 76 via the Simple Mail Transfer Protocol (SMTP). The SMTP server 76 stores each log file 56 in an inbox of mailbox 77. The name of the mailbox 77 may be the same as the warrant sequence number @ the agency's domain name. For example, warrant123@LAPD.com. The warrant sequence number may correspond with the warrant identifier 51A in configuration file 51 and the domain name may correspond with the IP address 51D in configuration file 51. Once transmitted and accepted by the SMTP email server 76, the log file 56 may be automatically deleted from user database 42.

The agency issuing the warrant can retrieve the captured log files 56 in remote server 76 for a particular user ID under interception using for example the Post Office Protocol (POPv3). The agency is given the name of email server 76, POP and SMTP port numbers, the mailbox id (warrant sequence number 51) and a password to access the mailbox 77. The agency then retrieves log files 56 in mailbox 77 using POP. Once a file is downloaded from the mailbox 77 to an agency terminal 72, the log file 56 may be automatically deleted from the mailbox 77.

Log Files

Figure 2:
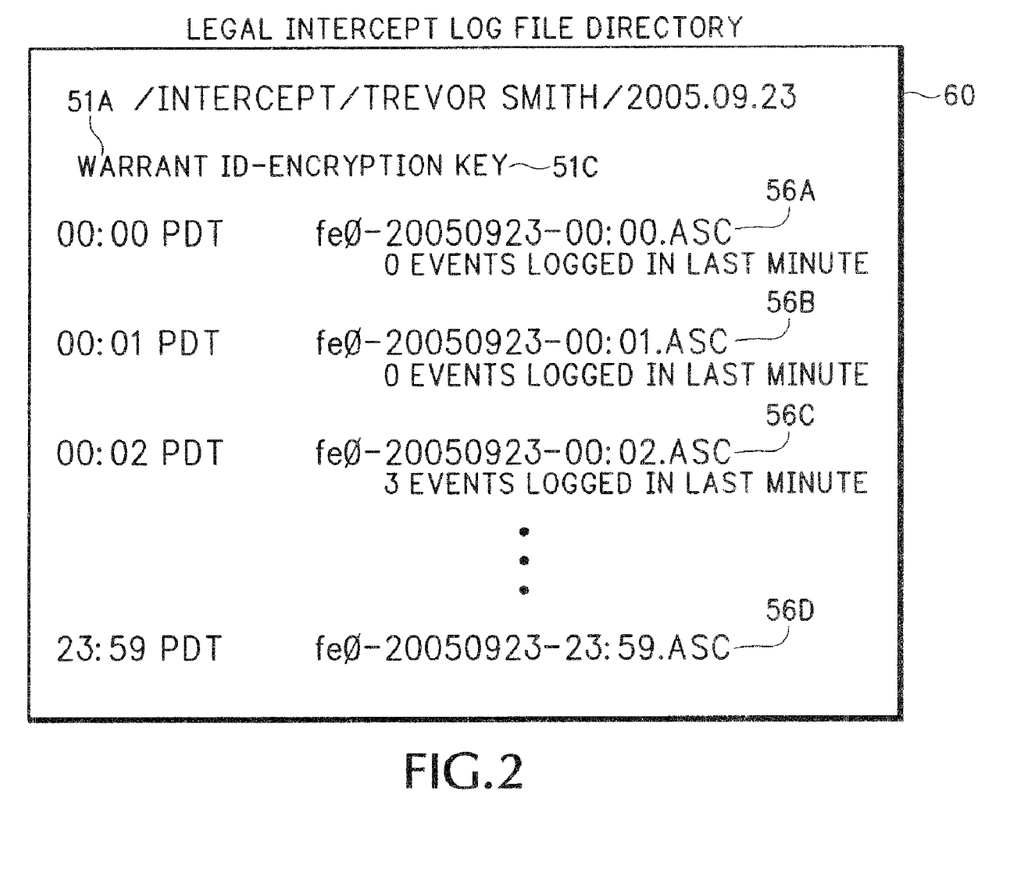
FIG. 2 is a diagram of an example log file generated for intercepted data.

Referring to FIGS. 1 and 2, the legal intercept software 50 generates log files 56 in a structured manner that provides more secure and reliable data authentication. In this example, an intercept directory 60 is loaded with log files 56 generated to account for every minute of a particular time period, such as an entire day. The legal intercept 50 may generate a name for directory 60 that identifies the contents as legal intercepts, for a particular user ID and for a particular day. Of course this is just one naming convention that can be used to more efficiently organize log files.

The log files 56 stored in directory 60 may indicate the number of events intercepted for the targeted device during each minute. For example, a first log file 56A is identified by the following log file name: fe0-2005/09/23-00:00.ASC, containing a single line that reads as follows: "0 events logged in the last minute". This indicates that a management server fe0 on Sep. 23, 2005, at 12:00 midnight logged zero intercept events for a particular user ID during the specified time period. A second log file 56B is named to identify a next minute of the intercept period and indicates that between 12:00 A.M and 12:01 A.M, on the same day, no intercept events were logged.

The first detected intercept events for this particular user ID for this particular day were detected in log file 56C identified by the log file name: fe0-2005/09/23-00:02.ASC, the first and/or last line of which reads "3 events logged in the last minute". Log file 56C indicates that 3 intercept events were detected on Sep. 23, 2005, between 12:01 A.M. and 12:02 A.M. The legal intercept 50 generates this contiguous set of log files 56 that cover each minute or other configured interval of the intercept period.

The legal intercept 50 may also load a first entry into the log file directory 60 that lists the warrant id 51A, PGP key 57, etc. The legal intercept 50 may also generate a log file 56 that indicates any management server status-change events. For example, if the management server 28 conducts a graceful shutdown, a log file 56 may be generated that indicates when the shut down occurred and possibly the cause of the shutdown.

This highly structured log file format provides the agency official a quick indicator of when intercept events are detected for a particular target user. Further, as shown above, the log files are created contiguously for predetermined time periods over a particular intercept period even when no intercept events are detected. This provides further verification that the legal intercept 50 was actually in operation and continuously monitoring for intercept events during the intercept period.

As described above, the log files 56 may be stored into a portable storage media that can be transported by an agency official. Alternatively, the log files 56 may be stored in the user database 42 in the communication management system 16 for later retrieval by the agency official via toolkit 54. In another implementation, the log files 56 may be sent to the mailbox 77 in a server 76 in a mobile operator infrastructure which is accessible by the agency official.

Figure 3:
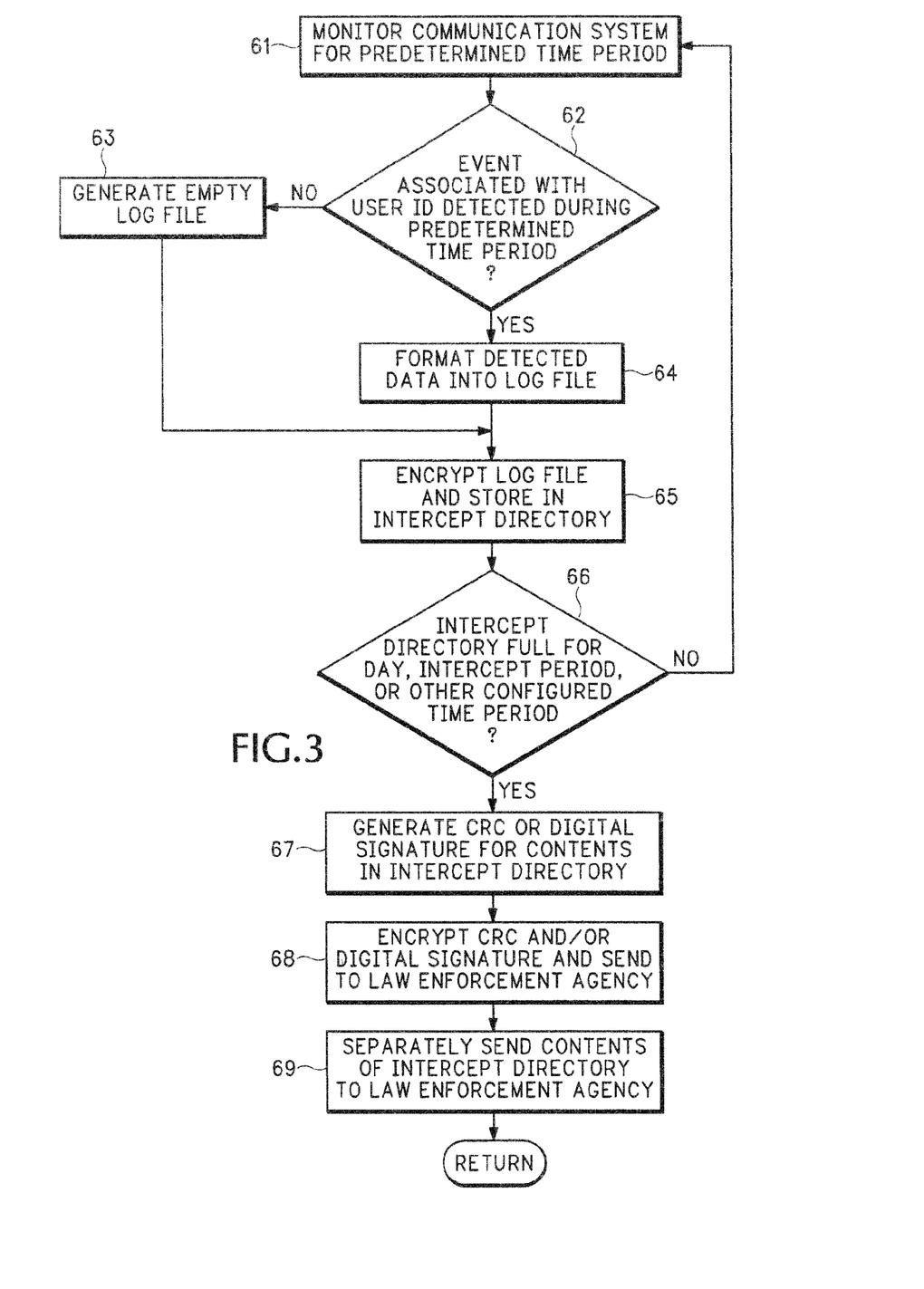
FIG. 3 is a flow diagram showing in more detail how the log files in FIG. 2 are generated.

FIG. 3 explains in further detail how the legal intercept module 50 might generate the log files. In operation 61, communications are monitored for a particular targeted user for predetermined time periods over an intercept period. In one example as described above, the predetermined time period may be one minute. Of course, time periods of less than one minute or more than one minute may also be used. The duration of these time periods may also be configurable by setting a parameter in configuration file 51. If no intercept events are detected during the predetermined time period in operation 62, an empty log file is generated for that time period in operation 63.

When intercept events are detected, all the intercepted data for that time period is formatted into a same log file 56 in operation 64. The log file is encrypted in operation 65 using the encryption key 57 (FIG. 1) loaded by the toolkit 54 into configuration file 51. All of the encrypted log files 56 associated with a particular targeted user for a particular intercept period are stored in a same intercept directory 60 (FIG. 2). For example, all log files generated for a particular user ID for a same day are stored in the same intercept directory. If the current day of legal interception is not completed in operation 66, further monitoring and interception is performed in operation 61.

When interception for a current interception period is completed, a Cyclic Redundancy Check (CRC) value, or some other type of digital certificate/signature, may be generated in operation 67. The CRC can be used to verify that the contents of intercept directory 60 have not been tampered with or deleted after their initial generation. The CRC may be encrypted in operation 68 and then separately emailed to the agency or separately stored for later validation. As discussed above, the encrypted log files may then either be emailed to a mailbox or stored locally for later retrieval by the enforcement agency.

Thus, the individual log file encryption in operation 65 ensures the authenticity of intercepted events for a particular time period and the CRC generated in operation 67 ensures that none of the individual log files have been removed or replaced.

Encrypted Intercept Data

Referring to FIG. 4, as described above, the log files 56 may be stored in database 42 or in a file system 53 within the management server 28. A single or multi-tiered encryption scheme may be used in network 12. For example, the personal client 40 may make an outbound connection 25 to the management server 28. The personal client 40 registers the presence of a particular user to the management server 28 and negotiates a security association specifying a cryptographic ciphersuite (including encryption cipher, key length, and digital signature algorithm) and a unique, secret point-to-point encryption key 29 over connection 25. In one example, the key 29 is an Advanced Encryption Standard (AES) key. Of course, encryption ciphers other than AES can also be used. The encryption key 29 enables secure communication between management server 28 and PC 38 over connection 25.

The mobile device 21 also negotiates a point-to-point security association, specifying a cryptographic ciphersuite and a unique encryption key 27, with the management server 28. In one example, the point-to-point encryption key 27 is also an AES encryption key. The negotiated security association that includes encryption key 27 enables secure point-to-point communication between the mobile device 21 and the management server 28 over connection 23. Each different mobile device 21 negotiates a different security association that includes a unique encryption key 27 with the management server 28.

The point-to-point encryption key 27 may be used for encrypting control data that needs to be transferred between the mobile device 21 and management server 28. The point-to-point encryption key 29 may be used for encrypting control data that needs to be transferred between the management server 28 and personal client 40. For example, the control data may include login information and transaction routing information.

An end-to-end security association, specifying a cryptographic ciphersuite and a unique encryption key 46, is negotiated between the mobile device 21 and the personal client 40. In one example, the end-to-end encryption key 46 is also an AES encryption key. The end-to-end encryption key 46 in one example is used for encrypting transaction payloads transferred between personal client 40 and mobile device 21. For example, the end-to-end encryption key 46 may be used for encrypting the content of emails, files, file path names, contacts, notes, calendars, electronic documents and any other type of data transferred between mobile device and the PC. The end-to-end encryption key 46 is only known by the mobile device 21 and the personal client 40. Data encrypted using the end-to-end key 46 cannot be decrypted by the management server 28.

Figure 5:
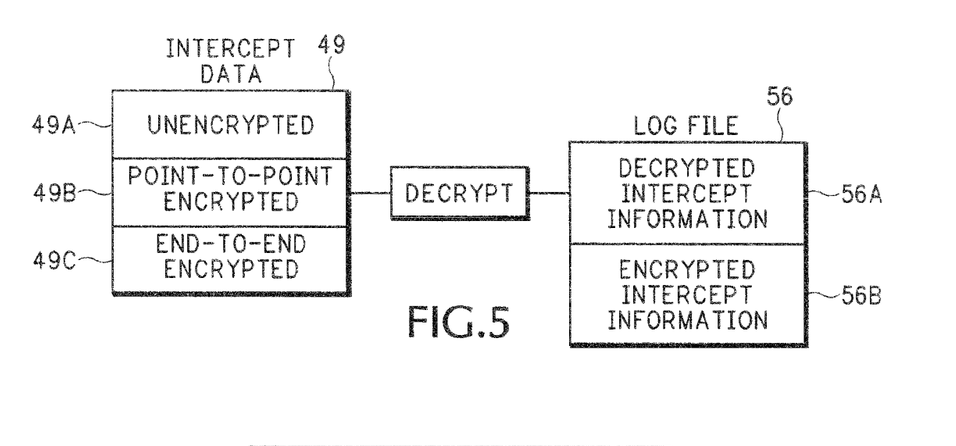
FIG. 5 is a diagram showing how intercepted data with different encryptions is converted into a log file.

Referring to FIGS. 4 and 5, the legal intercept module 50 can produce log files 56 from intercept data 49 that have any combination of unencrypted data 49A sent in the clear, point-to-point encrypted data 49B encrypted using the point-to-point encryption keys 27 or 29, and end-to-end encrypted data 49C encrypted using the end-to-end encryption key 46.

The communication management system 16 has access to the point-to-point encryption keys 27 and 29 used for encrypting the point-to-point encrypted information 49B. Therefore, the management system 16 can automatically decrypt the point-to-point encrypted information 49B before it is reformatted into log file 56.

The end-to-end encryption keys 46 are only shared between the endpoints 21 and 38 and are unknown to the communication management system 16. Therefore, the agency issuing the warrant may be required to extract the end-to-end encryption keys 46 either at the mobile device 21 or at the enterprise server 34 or personal computer 38. The end-to-end encrypted information 49C may then be decrypted at a later time separately from the point-to-point encrypted information 49B.

For example, after receiving and decrypting the log file 56, the enforcement agency may then independently conduct a seizure of the end-to-end encryption key 46 from either the enterprise network 18 or the mobile device 21. The enforcement agency could then separately decrypt information 56B in log file 56 with the seized end-to-end encryption key 46.

Figure 6:
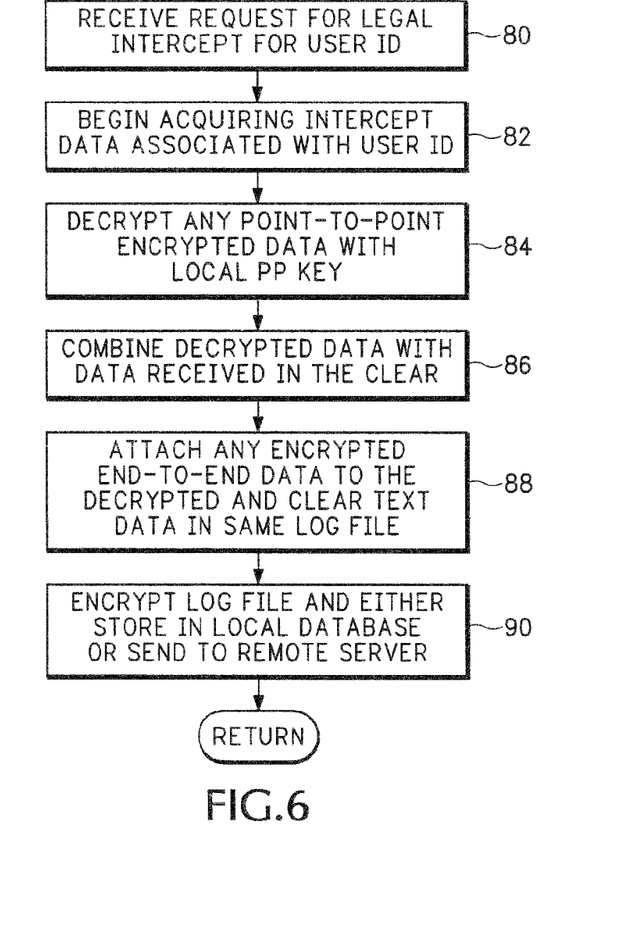
FIG. 6 is a flow diagram showing in more detail how different types of encrypted data are formatted into a log file.

FIG. 6 explains in more detail how the legal intercept module 50 handles the decryption and reformatting of intercept data into log files. In operation 80, the management server 28 is configured to conduct a legal intercept for a particular user ID as described above in FIG. 1. Accordingly, the management server 28 begins intercepting data for the identified user ID in operation 82.

In operation 84, any point-to-point encrypted portion 49B of the intercepted data 49 (FIG. 5) is decrypted. In operation 86, the decrypted point-to-point data is combined with any information 49A in the intercept data 49 received in the clear. The unencrypted data is then formatted into an unencrypted portion 56A of the log file 56 in FIG. 5. Any end-to-end encrypted data 49C is then combined in the same log file 56 as section 56B in operation 88. The log file 56 is then possibly encrypted in operation 90 and then either stored in a local database or automatically sent to a remote server.

Detecting Different Types of Intercept Data

Figures 7, 8:
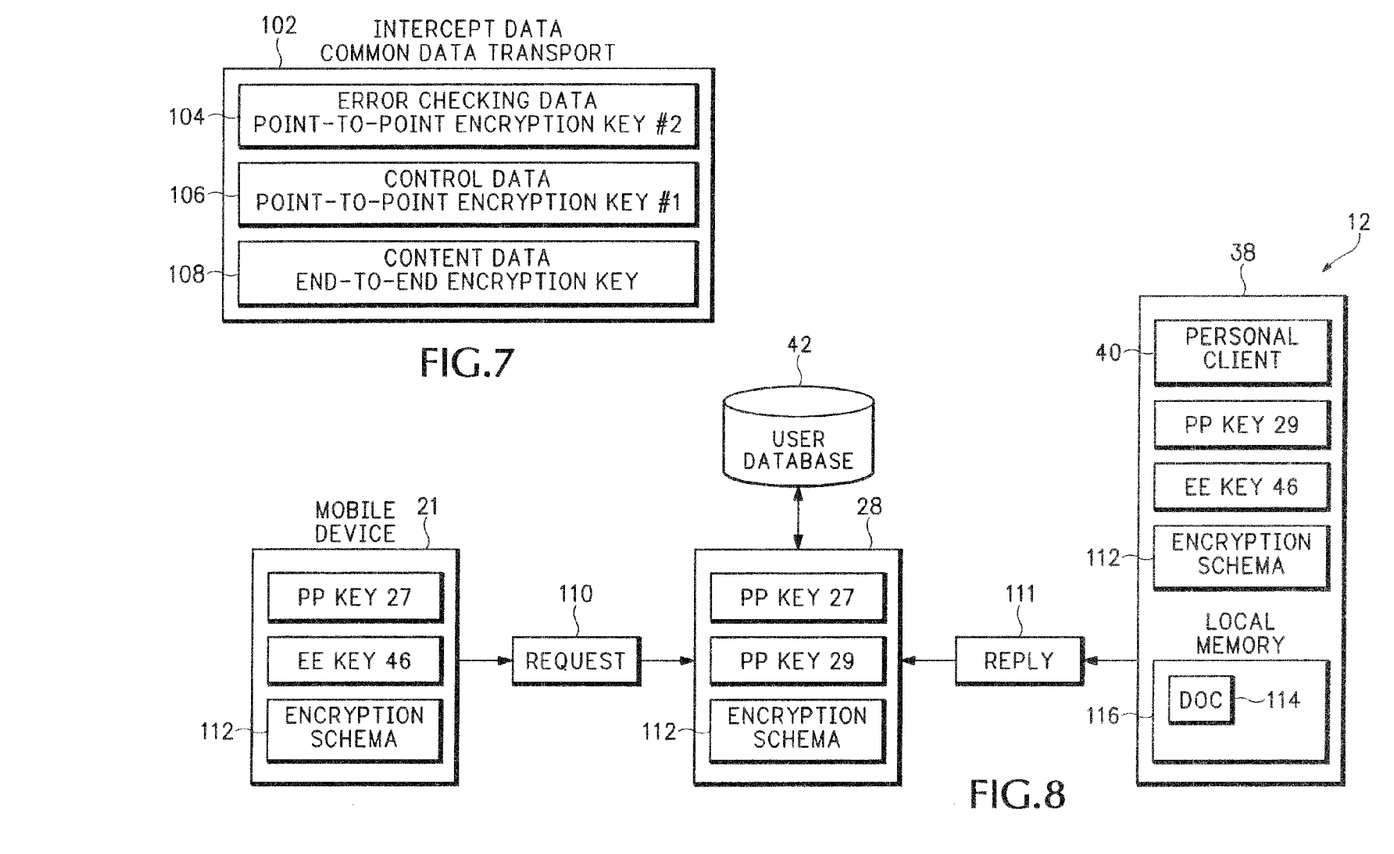
FIG. 7 is a diagram showing how a common transport is used for sending encrypted data.
FIG. 8 is a block diagram showing how an encryption schema in the communication management system is used in cooperation with the intercept system.

FIGS. 7 and 8 explain in more detail how a particular data format used by the communication system 12 can be used to identify point-to-point and end-to-end encrypted intercept data. FIG. 7 shows how encryption can be performed differently for different types of data or for data associated with different destinations. Intercept data 102 includes content data 108 such as the contents of an email message, an electronic document, or any other type of information that should only be accessed by two endpoints. The content data 108 in this example is encrypted using an end-to-end encryption key.

A second portion 106 of intercept data 102 may include control information that only needs to be processed by one particular server. In this case, control data 106 may be encrypted using a first point-to-point encryption key. A third portion 104 of intercept data 102 may have other control information, for example, error checking data, that needs to be processed by a different server. Accordingly, the error checking data 104 is encrypted using a second point-to-point encryption key different than either of the other two encryption keys used for encrypting data 108 and 106.

FIG. 8 shows in more detail an encryption schema 112 is used by the mobile device 21, management server 28, and personal client 40 when processing transactions between a source and a target device. In the example below, the mobile device 21 is operating as a source for sending a transaction 110. The transaction 110 requests personal client 40 to send a document 114 located in a personal directory in local memory 116 of PC 38. The personal client 40 operates as a target for the transaction 110 and the management server 28 operates as the transfer agent for transferring the transaction 110 from the mobile device 21 to the personal client 40.

It should be understood that this is only an example, and the devices shown in FIG. 8 can process many different types of transactions. For example, the transaction 110 may request synchronization of emails in the PC 38 with emails in the mobile device 21. Further, any device can operate as a source or target for the transaction. For example, the personal client 40 operates as a source and the mobile device 21 operates as a target when a transaction 111 is sent as a reply to request 110.

The mobile device 21, management server 28, and the personal client 40 are all configured with an encryption schema 112 that identifies how specific items in the transaction 110 are to be encrypted. Each device is also configured with different security associations as described above in FIG. 4. For example, the mobile device 21 has both Point-to-Point (PP) key 27 and End-to-End (EE) key 46. Management server 28 has PP key 27 and PP key 29, and the PC 38 has PP key 29 and EE key 46.

The mobile device 21 forms the request transaction 110. One example of a request is as follows.

```
Request:    {auth_token = "abc",
             device_id = "xyz",
             method_id = "GetDocument",
             args = {path = "/docs"}
            }
```

Mobile device 21 attaches an auth_token to transactions sent to the management server 28. For example, the mobile device 21 may be required to authenticate to the management server 28 by transmitting a username and password prior to being permitted to submit other transactions for processing. The management server 28 issues the mobile device 21 an auth_token after successfully validating the username and password against information in the user database 42. The mobile device 21 then attaches the auth_token to subsequent transactions sent to the management server 28. The management server 28 uses the auth_token to identify and authenticate the source of each transaction and to determine where to route the transaction.

The device_id identifies the particular mobile device 21 sending the request 110. The device_id may be necessary, for example, when a user has more than one mobile device. The personal client 40 can use different device_id values to track when synchronization information was last sent to each of multiple different mobile devices. The device_id can also be used by either the management server 28 or the personal client 40 to determine how to format data sent to particular types of mobile devices 21. For example, data may need to be formatted differently for a cell phone as opposed to a personal computer. The device_id can also be used to correlate a known security association with a particular mobile device.

The method_id item in the example identifies a particular function GetDocument associated with request 110. The method_id item also requires the inclusion of related argument items that identify the parameters for the GetDocument function. For example, the argument items might include the expression path="/docs" identifying the pathname where the requested documents are located.

In order to prepare the request 110 for transmission, the mobile device 21 performs a pattern match of the request 110 using the encryption schema 112. This pattern match separates the items in request 110 into different channels. One example of the different channels is shown below. In this example, the items in each channel are associated with pre-defined security associations: clear, pp, and ee.

```
Channels:
    {clear = { device_id = "xyz"}
    pp = {auth_token = "abc", method_id = "GetDocument"}
    ee = {args = {path = {path = "/docs"}}}
    }
```

The channel contents are encoded (via a process commonly known as serialization) into arrays of bits or bytes referred to as data groups. These groupings of bits or bytes are referred to generally below as arrays, but can be any type of partition, group, etc.

The contents of the clear channel are encoded into an array of bits referred to as data_group_1, the contents of the pp channel are encoded into an array of bits referred to as data_group_2, and the contents of the ee channel are encoded into an array of bits referred to as data_group_3. The contents of each channel need to be encoded into bit arrays so that they can be encrypted. The contents of the channels after being encoded into bit arrays are represented as follows.

```
Encoded
Channels:    {clear = data_group_1
              pp = data_group_2
              ee = data_group_3}
```

The bit arrays are then encrypted according to the security association parameters for each channel. According to the encryption schema 112, bits in the clear channel (data_group_1) are not encrypted. The bits in the pp channel data_group_2 are encrypted using the point-to-point security association between mobile device 21 and management server 28, using PP key 27, and are referred to after encryption as pp_data_group_2. The bits in the ee channel data_group_3 are encrypted using the end-to-end security association between mobile device 21 and personal client 40, using EE key 46, and are referred to after encryption as ee_data_group_3. The data groups are represented as follows after encryption:

```
Encrypted
Channels:    {clear = data_group_1
              pp = pp_data_group_2
              ee = ee_data_group_3}
```

The bits making up the encrypted and unencrypted channels are then encoded into one or more packets. For clarity, the description below will refer to a single packet, however, the data from the channels may be contained in multiple packets. Some of the contents of the packet are shown below.

| Packet: | |
|---|---|
| Header | length |
| | version |
| | flags |
| Payload | count = 3 |
| | "clear" |
| | data_group_1 |
| | "pp" |
| | pp_data_group_2 |
| | "ee" |
| | ee_data_group_3 |

Information in the packet header may include the packet length, a version number, and other flags. The packet payload includes a count identifying 3 pairs of items. The three items include the non-encrypted contents in the clear channel, the pp encrypted contents of the pp channel, and the ee encrypted contents of the ee channel. The packet is then transported by mobile device 21 to the management server 28.

The transfer agent operating in server 28 receives the packet. The bits in the packet are separated into the different channels clear=data_group_1, pp=pp_data_group_2, and ee=ee_data_group_3.

The data in the clear channel does not need to be decrypted. The transfer agent decrypts the only bits in channels for which it has a known security association. The transfer agent, as a member of the point-to-point security association between mobile device 21 and management server 28, possesses the PP key 27 and therefore decrypts the contents of the pp channel. The transfer agent is not a member of the end-to-end security association between mobile device 21 and personal client 40, does not have the EE key 46 and therefore does not decrypt the data in the ee channel. Decryption produces the following data groups: clear data_group_1, pp=data_group_2, and ee=ee_data_group_3.

The transfer agent decodes the contents of the clear and pp channels. The contents of the encrypted ee channel are not decoded, but instead are maintained in an unmodified state for eventual transport to the personal client 40. Decoding produces the following contents.

| Decoded Channels: | {clear = {device_id = "xyz"} |
|---|---|
| | pp = {auth_token = "abc", method_id = "GetDocument"} |
| | ee=ee_data_group_3 |
| | } |

A partial request is formed by merging the items of the clear and pp channels. The partial request in this example could look similar to the following:

| Partial Request: | {auth_token = "abc", |
|---|---|
| | device_id = "xyz", |
| | method_id = "GetDocument", |
| | args = { } |
| | encrypted = {ee=ee_data_group_3} |
| | } |

The transfer agent 31 in the management server 28 processes the partial request. In this example, the transfer agent may verify the request is authorized by matching the value of auth_token ("abc") with contents in the user database 42 (FIG. 8). The auth_token and the method_id ("GetDocument") indicate that the transaction 110 is a document request directed to the personal client 40.

The transfer agent may identify a user_id="joe" associated with the auth_token="abc" and generate the following new request.

| New Request: | {user_id = "joe", |
|---|---|
| | device_id = "xyz", |
| | method_id = "GetDocument", |
| | args = { } |
| | encrypted = {ee=ee_data_group_3} |
| | } |

The legal intercept 50 in FIG. 1 may come into play at this point, or earlier in the encryption schema 112. For example, the legal intercept 50 checks the user_id in the request with the user id 51B in the intercept configuration file 51. In this example, if "joe" matches the user_id 51B in configuration file 51, then the contents in the request are formatted into a log file 56 as described above. As can be seen, at this point the new request has already decrypted the auth_token="abc" and method_id="GetDocument". Further, the device_id="xyz" was received in the clear. The legal intercept 50 simply has to format these different channels into a log file.

The end-to-end encrypted data in group 3 remains encrypted and therefore may not provide all of the information desired for the enforcement agency. However, the decrypted information does provide enough information to adequately indicate that the intercepted data is associated with a particular user_id. The intercepted unencrypted data may also provide further evidence that the enforcement agency can then use to obtain another warrant to seize the ee encryption key from the targeted user.

As described above in FIG. 2, the legal intercept 50 may then attach appropriate time/date stamp headers to this raw data frame to authenticate the time and date when the data was intercepted.

End-to-End Encrypted Data

As described above, the communication management system 16 may not have access to the end-to-end encryption keys 46 (FIG. 2). However, as shown in FIG. 8, the management server 28 is still capable of identifying data streams belonging to users targeted for interception, as this identifying information is required for routing the datagrams shown above. Thus, the legal intercept module 50 can still intercept data that cannot be immediately decrypted.

The intercept logs 56 can therefore contain data encrypted using encryption keys known only to the endpoints. For example, a mobile device 21 and a desktop connector running on personal computer 38 (FIG. 1). The toolkit 54 in FIG. 1 can facilitate the recovery of the end-to-end keys 46.

In order to make use of this functionality, the enforcement agency seeking the information may need to obtain both an intercept warrant, and either a search-and-seizure warrant authorizing the extraction of the configuration data from the smart device client in the mobile device 21 or a search-and-seizure warrant authorizing the extraction of the end-to-end encryption key from the desktop connector in the PC 38 (FIG. 1).

After the authorized agency has executed the necessary warrants, the toolkit 54 is used by the agency to facilitate the recovery of the end-to-end key 46. The toolkit utility 54 then uses the end-to-end key 46 to decrypt the end-to-end encrypted information in the log files 56.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method for intercepting data, comprising:
   receiving, at a management server, a connection from a remote client, the connection being initiated by the remote client and established outbound from the remote client;
   negotiating a point-to-point encryption scheme with a remote mobile device, the point-to-point encryption scheme negotiated between the management server and the remote mobile device;
   receiving, at the management server, a value identifying an intercept target for a legal intercept and an indication that interception is authorized by a warrant, the intercept target corresponding to the remote mobile device;
   automatically intercepting, at the management server, data received and/or sent by the intercept target identified by the value, wherein data is intercepted without altering operation of email application services that operate on the remote mobile device;
   inspecting packets having the intercepted data to distinguish end-to-end encrypted information from other information that is encrypted according to the point-to-point encryption scheme negotiated with the remote mobile device;
   preserving encryption that is included on the end-to-end encrypted information when received while removing encryption that is included on at least a portion of the other information, said other information decrypted using a key obtained during the point-to-point encryption scheme negotiation; and transferring both the decrypted other information and the end-to-end information from the management server to a remote device.

2. The method of claim 1, wherein the packets are intercepted during a requested time period, and the method further comprises:
   formatting the data that is intercepted during the requested time period and associated with the target user into one or more first log files, each of the first log files corresponding to a different time segment occurring during the requested time period and indicating one or more intercept events for its corresponding time segment; and
   formatting one or more second different log files associated with the requested time period, the second log files indicating inactivity and corresponding to different remaining time segments that occur during the requested time period and that are unrepresented by the first log files that indicate the intercept events such that the first and second log files record monitoring for the entire requested time period independently of whether the data is intercepted intermittently during the requested time period.

3. The method of claim 2, wherein the data is intercepted according to an intercept configuration file that includes at least a unique intercept identifier and a user ID identifying the target user.

4. The method of claim 2, wherein the log files record an unbroken sequence of continuous monitoring over the requested time period independently of whether the data is intercepted intermittently.

5. The method of claim 2, further comprising transferring the log files to the remote device.

6. The method of claim 2, further comprising formatting the log files with different time values usable for verifying that communications from the remote mobile device were continuously monitored during the requested time period regardless of whether the data was intercepted intermittently.

7. The method according to claim 1, wherein the encryption that is included on the end-to-end encrypted information uses a security association that is kept secret from the management server such that the end-to-end encrypted information is kept private with respect to employees associated with the management server.

8. The method of claim 1, further comprising determining whether to encrypt at least one of the end-to-end information and the decrypted information prior to said transferring.

9. The method according to claim 1, further comprising:
   combining, at the management server, the end-to-end encrypted information of the intercepted data with the decrypted other information of the intercepted data in a same log file.

10. The method according to claim 1, further comprising:
    storing, at the management server, the intercepted data in a structure format that identifies when the data was intercepted and at the same time provides authentication that the stored intercepted data has not been altered or deleted.

11. The method according to claim 10, further comprising monitoring communications between the remote client and the remote mobile device for multiple contiguous time periods.

12. The method according to claim 11, further comprising:
    generating, using the management server, log files over an intercept period that encompasses the multiple contiguous time periods;
    storing the log files in a same intercept directory;
    inserting a warrant identifier received together with the value into the intercept directory; and
    generating a name for the intercept directory that identifies the intercept target and the intercept period over which the log files were generated.

13. The method according to claim 12, further comprising:
    encrypting the log files in the intercept directory with an encryption scheme known by an agency issuing the warrant, said encryption performed using the management server that intercepted the data; and
    sending the encrypted intercept directory to an electronic mailbox accessible by the agency.

14. The method according to claim 13, further comprising:
generating a Cyclic Redundancy Check (CRC) or other digital signature value for all of the log files in the intercept directory;
encrypting the resulting generated value; and
providing the encrypted generated value to the enforcement agency, said encrypted generated value sent in a different communication than the encrypted intercept directory, said encrypted generated value verifying that the log files have not been altered.

15. The method according to claim 1, further comprising:
reading an intercept configuration file that contains a warrant identifier, the value identifying the user, an enforcement agency known encryption key and an electronic mailbox address;
upon reading the intercept configuration file automatically intercepting data received and/or sent by the remote mobile device;
formatting any intercepted data into log files that identify when the data was intercepted; and
encrypting the log files using the encryption key.

16. The method according to claim 1, wherein the end-to-end encrypted information is associated with content and is protected with an end-to-end encryption scheme that is kept secret from any midpoints located on a call path between transmitting and receiving endpoints, and the other information is associated with transaction routing information and is protected with the negotiated point-to-point encryption scheme.

17. A communication management system, comprising:
a management server configured to receive a connection initiated by a remote client and established outbound from the remote client;
the management server configured to negotiate a point-to-point encryption scheme with a remote mobile device, the point-to-point encryption scheme negotiated between the management server and the remote mobile device;
the management server configured to receive a value identifying an intercept target for a legal intercept and an indication that interception is authorized by a warrant, the intercept target corresponding to the remote mobile device;
the management server configured to automatically intercept data received and/or sent by the intercept target identified by the value, wherein the data is intercepted without altering operation of email application services that operate on the remote mobile device;
the management server configured to inspect packets having the intercepted data to distinguish end-to-end encrypted information from other information that is encrypted according to the point-to-point encryption scheme negotiated with the remote mobile device;
the management server configured to preserve encryption that is included on the end-to-end encrypted information when received while removing encryption that is included on at least a portion of the other information, said other information decrypted using a key obtained during the point-to-point encryption scheme negotiation; and the management server configured to transfer both the decrypted other information and the end-to-end information from the management server to a remote device.

18. The communication management system of claim 17, further comprising:
the management server configured to automatically format the intercepted data into log files;
the management server configured to generate multiple log files that identify any intercepted data for associated contiguous predetermined time periods extending over a continuous intercept period; and
the management server configured to generate the log files for back-to-back time periods, the management server further configured to generate each log file by selecting between inserting the intercepted data and an inactivity indication therein such that each of the log files contains at least one selected from the group comprising the intercepted data for the associated time period and an indication that no data was intercepted during the associated time period.

19. The communication management system of claim 18, further comprising:
the management server is configured to select a same duration for the time periods according to selectable time interval values included in an intercept configuration file.

20. The communication management system of claim 18, further comprising:
the management server configured to encrypt the log files according to an encryption key known by an enforcement agency associated with the warrant before emailing the encrypted log files to a mailbox for the enforcement agency.

21. The communication management system of claim 18, further comprising:
the management server configured to identify a first portion of the intercepted data encrypted using a first known security association for which the management server has knowledge of the encryption key and identify a second portion of the intercepted data encrypted using a second unknown security association, the management server configured to decrypt and store the first portion of the intercepted data into an associated one of the log files and combine the encrypted second portion of the intercepted data with the decrypted first portion of the intercepted data in the same associated log file.

22. The communication management system of claim 21, wherein the first portion of the intercepted data is encrypted with a known point-to-point encryption key and the second portion of the intercepted data is encrypted with an unknown end-to-end encryption key.

23. The communication management system of claim 21, further comprising:
the management server is configured to encrypt both the decrypted first portion of the intercepted data and the second encrypted portion of the intercepted data.

24. The communication management system of claim 21, wherein the first portion of the intercepted data includes transaction authentication and routing information and the second portion of the intercepted data includes the contents of email messages, electronic files, or other electronic data.

25. The communication management system of claim 17, wherein the management server is configured to process communications exchanged between a local device operating in an enterprise or local network and a mobile wireless device that synchronizes with a portion of the data in the local device.

* * * * *

UNITED STATES PATENT AND TRADEMARK OFFICE
CERTIFICATE OF CORRECTION

PATENT NO. : 7,680,281 B2  Page 1 of 1
APPLICATION NO. : 12/211790
DATED : March 16, 2010
INVENTOR(S) : Fiatal et al.

It is certified that error appears in the above-identified patent and that said Letters Patent is hereby corrected as shown below:

At column 13, line 56, please replace "and transferring" with --and¶transferring--.
At column 15, line 62, please replace "and the management" with --and¶the management--.

Signed and Sealed this

Eighth Day of June, 2010

David J. Kappos
*Director of the United States Patent and Trademark Office*